US 12,304,734 B2
May 20, 2025

(54) TRANSPORT SYSTEM (71) Applicant: Murata Machinery, Ltd., Kyoto (JP)

(72) Inventors: Kazuma Yagawa, Ise (JP); Kazuhiro Ishikawa, Inuyama (JP)

(73) Assignee: Murata Machinery, Ltd., Kyoto (JP)

( * ) Notice: Subject to any disclaimer, the term of this patent is extended or adjusted under 35 U.S.C. 154(b) by 321 days.

(21) Appl. No.: 17/909,929

(22) PCT Filed: Jan. 26, 2021

(86) PCT No.: PCT/JP2021/002629
§ 371 (c)(1),
(2) Date: Sep. 7, 2022

(87) PCT Pub. No.: WO2021/181919
PCT Pub. Date: Sep. 16, 2021

(65) Prior Publication Data
US 2023/0106446 A1  Apr. 6, 2023

(30) Foreign Application Priority Data

Mar. 10, 2020  (JP) ................................ 2020-041079

(51) Int. Cl.
*B65G 1/06* (2006.01)
*F16F 15/08* (2006.01)
(Continued)

(52) U.S. Cl.
CPC ............... *B65G 1/06* (2013.01); *F16F 15/08* (2013.01); *F16G 13/16* (2013.01); *H02G 3/0456* (2013.01)

(58) Field of Classification Search
CPC .......... B65G 1/06; F16G 13/16; H02G 3/0456
See application file for complete search history.

(56) References Cited

U.S. PATENT DOCUMENTS 5,944,202 A * 8/1999 Wylie ................. B65G 1/06
211/151
2016/0001976 A1   1/2016 Nagamine
(Continued)

FOREIGN PATENT DOCUMENTS

CN     202004386 U    10/2011
CN     104956473 A     9/2015
(Continued)

OTHER PUBLICATIONS

International Search Report dated Apr. 20, 2021, of corresponding International Application No. PCT/JP2021/002629 along with an English translation.

*Primary Examiner* — Saul Rodriguez
*Assistant Examiner* — Willie W Berry, Jr.
(74) *Attorney, Agent, or Firm* — DLA Piper LLP (US)

(57) ABSTRACT

A transport system includes a transport device to transport an article, a cable unit, one end of which is connected to the transport device, the other end of which is fixed to ground side, the cable unit configured to move in accordance with movement of the transport device, and a placement section capable of placing the cable unit. The placement section has a base, and a first damping member provided on the base and having damping properties higher than that of the base. The first damping member does not support the cable unit thereon.

10 Claims, 11 Drawing Sheets (51) Int. Cl.
*F16G 13/16* (2006.01)
*H02G 3/04* (2006.01)

(56) References Cited

U.S. PATENT DOCUMENTS

2016/0176633 A1\* 6/2016 Tanaka ................. B65G 1/0407
 414/273
2020/0215999 A1 7/2020 Yamamoto et al.

FOREIGN PATENT DOCUMENTS

| | | |
|---|---|---|
| CN | 106494182 A | 3/2017 |
| CN | 107072096 A | 8/2017 |
| JP | 2005-124265 A | 5/2005 |
| JP | 2008-089114 A | 4/2008 |
| JP | 2011-106618 A | 6/2011 |
| JP | 4986668 B2 | 7/2012 |
| JP | 2013-053701 A | 3/2013 |
| JP | 2016-117550 A | 6/2016 |
| JP | 2019-68563 A | 4/2019 |
| KR | 2015-0140902 A | 12/2015 |
| WO | 97/40289 A1 | 10/1997 |

\* cited by examiner

TRANSPORT SYSTEM

TECHNICAL FIELD

This disclosure relates to a transport system.

BACKGROUND

A surface mounting apparatus described in Japanese Patent No. 4986668 is known as a technique related to a transport system. The surface mounting apparatus described in Japanese Patent No. 4986668 includes a head unit (transport device) and a CABLEVEYOR (registered trademark, cable unit) coupled to the head unit. In the surface mounting apparatus described in Japanese Patent No. 4986668, a damping member such as rubber is provided between the CABLEVEYOR and a guide member to guide the CABLEVEYOR.

In the above-described technique, vibration caused by movement of a cable unit is suppressed by a damping member. However, in the above-described technique, the damping member is worn by a contact with the cable unit. Thus, there are problems in which the damping member easily degrades and durability of vibration suppression performance of the system is low.

Therefore, it could be helpful to provide a transport system capable of suppressing vibration caused by movement of the cable unit and improving durability of vibration suppression performance.

SUMMARY

A transport system includes a transport device to transport an article, a cable unit, one end of which is connected to the transport device, the other end of which is fixed to ground side, the cable unit configured to move in accordance with movement of the transport device, and a placement section on which the cable unit can be placed. The placement section has a base and a first damping member provided on the base and having damping properties higher than that of the base. The first damping member does not support the cable unit thereon.

In this transport system, vibration caused by movement of the cable unit can be suppressed by the first damping member. In addition, no abrasion is caused by a contact between the first damping member and the cable unit, and no load of the cable unit is applied to the first damping member. Thus, the first damping member is not easily degraded. Therefore, durability of vibration suppression performance can be improved.

A part of the cable unit placed on the placement section is in contact with the placement section, and the first damping member may be provided at a position that does not overlap with a contact surface where the cable unit comes into contact with the placement section viewed from above. In this structure, a configuration can be specifically realized in which the first damping member does not support the cable unit.

The cable unit placed on the placement section is in contact with the placement section at both sides of its width direction, and the first damping member may be arranged between the both sides of the cable unit viewed from above. In this structure, a configuration can be specifically realized in which the first damping member does not overlap with the contact surface of the cable unit viewed from above. Further, a space between the both sides can be used, thus enabling a space saving.

The cable unit may have at least any one of a power cable and a signal cable that are connected with the transport device, and a cable housing unit connected to the transport device and configured to house at least any one of the power cable and the signal cable inside and to guide at least any one of the power cable and the signal cable so that at least any one of the power cable and the signal cable follows movement of the transport device. In this structure, the cable unit can be specifically configured. Further, at least any one of the power cable and the signal cable can follow movement of the transport device while being protected.

The transport device may be configured to move in a first direction and the base may include a restriction unit to restrict movement of the cable unit placed on the base in a second direction intersecting the first direction. In this structure, the cable unit can be prevented by the restriction unit from shifting in the second direction.

The placement section may have a second damping member provided on the base and made of a material different from that of the first damping member, and the second damping member may support the cable unit thereon. Vibration caused by movement of the cable unit can be further suppressed.

The second damping material may be provided at a position that overlaps with a contact surface where the cable unit comes into contact with the placement section viewed from above. In this structure, a configuration can be specifically realized in which the second damping member supports the cable unit.

The placement section may have a protection member provided on the second damping member and made of a material harder than that of the second damping member. Whereby, the second damping member can be protected.

The placement section may have a flat and smooth member provided on the protection member and made of a material having a friction coefficient lower than that of the protection member. Whereby, abrasion of the protection member caused by a contact with the cable unit can be suppressed.

The transport system may include a stocker having a plurality of shelves to house an article and a stand to support the stocker, and the placement section may be attached to the stand. In this structure, vibration caused by movement of the cable unit is easily transmitted to the stocker and the article via the stand. Suppression of vibration to the article is important. Thus, the above mentioned effects to suppress vibration caused by movement of the cable unit are especially effective.

We thus provide a transport system capable of improving durability of vibration suppression performance while suppressing vibration caused by movement of a cable unit.

REFERENCE SIGN LIST

1 . . . Transport system, 2 . . . Stocker, 7, 7A, 7B . . . Stacker crane (transport device), 8 . . . . Stand, 10 . . . Cable unit, 11 . . . Power cable, 15 . . . CABLEVEYOR (cable housing unit), 21 . . . Fixed guide (placement section), 22 . . . Base, 23 . . . Restriction wall (restriction unit), 24 . . . First damping member, 25 . . . Second damping member, 26 . . . Protection member, 27 . . . Flat and smooth member, R . . . Contact surface, S . . . Shelf

DETAILED DESCRIPTION

Hereinafter, with reference to the drawings, an example will be described in detail. The same signs are given to the same or equivalent component or part to simplify the description.

Figure 1:
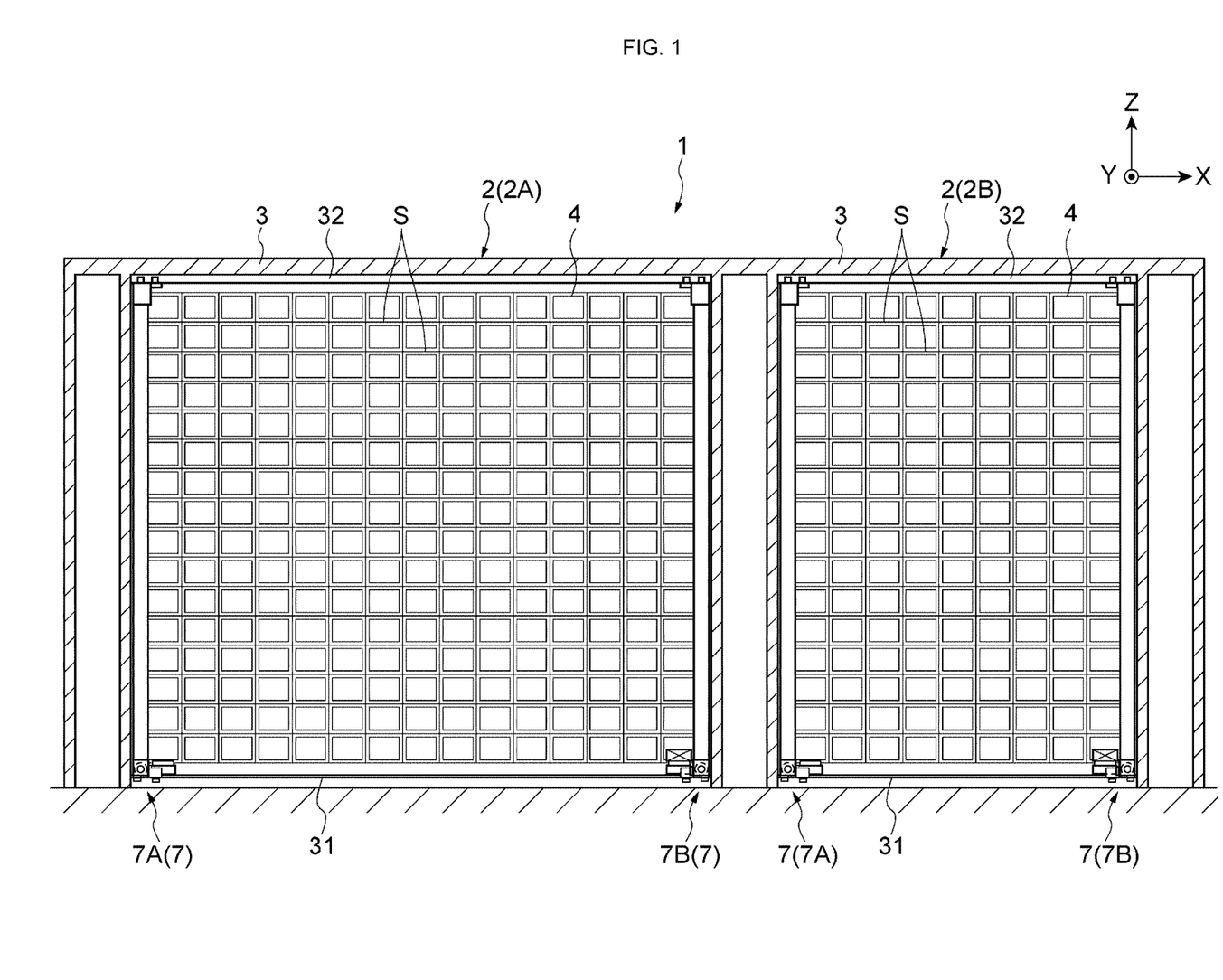
FIG. 1 is a front view of a transport system according to an example.

As shown in FIG. 1, a transport system 1 according to an example includes a plurality of stockers 2. In the stocker 2, a stacker crane 7 travels inside a stocker body 3 and an article is transferred between a plurality of shelves S provided inside the stocker body 3 and a storage/retrieval port (not illustrated). For example, the article transferred by the stacker crane 7 is stored in the stocker 2. The article is, for example, a container such as a FOUP (Front-Opening Unified Pod) to house wafers processed by a semiconductor manufacturing device or a liquid crystal manufacturing device and a reticle pod to house reticles used in a semiconductor manufacturing device or a liquid crystal manufacturing device.

In the transport system 1, two (a plurality of) stockers 2A, 2B are arranged in a traveling direction of the stacker crane 7. In the transport system 1, two stacker cranes 7 (7A, 7B) are arranged inside of each stocker 2. The stocker 2 has the stocker body 3, a rack 4, and the stacker cranes 7A, 7B. The stocker 2 is supported by a stand 8 (refer to FIG. 5). Hereinafter, for convenience, a traveling direction of the stacker crane 7 is referred to as a X direction (first direction), a vertical direction is referred to as a Z direction, and a horizontal direction perpendicular to the X direction and the Z direction is referred to as a Y direction (second direction).

The stocker body 3 is formed, for example, in a hollow rectangular shape. A travel rail 31 on which the stacker crane 7 travels, and an auxiliary rail 32 arranged to face the travel rail 31 in the Z direction are laid on the stocker body 3 along the X direction. The stacker crane 7 travels (moves) along the travel rail 31 and the auxiliary rail 32. The stacker crane 7 transports an article between a shelf S and the storage/retrieval port, and transfers an article from/to the shelf S. The rack 4 is arranged in the stocker body 3 along the X direction. A pair of the rack 4 are arranged to face each other via the travel rail 31. The rack 4 is provided with a plurality of shelves S to house articles.

Figure 2:
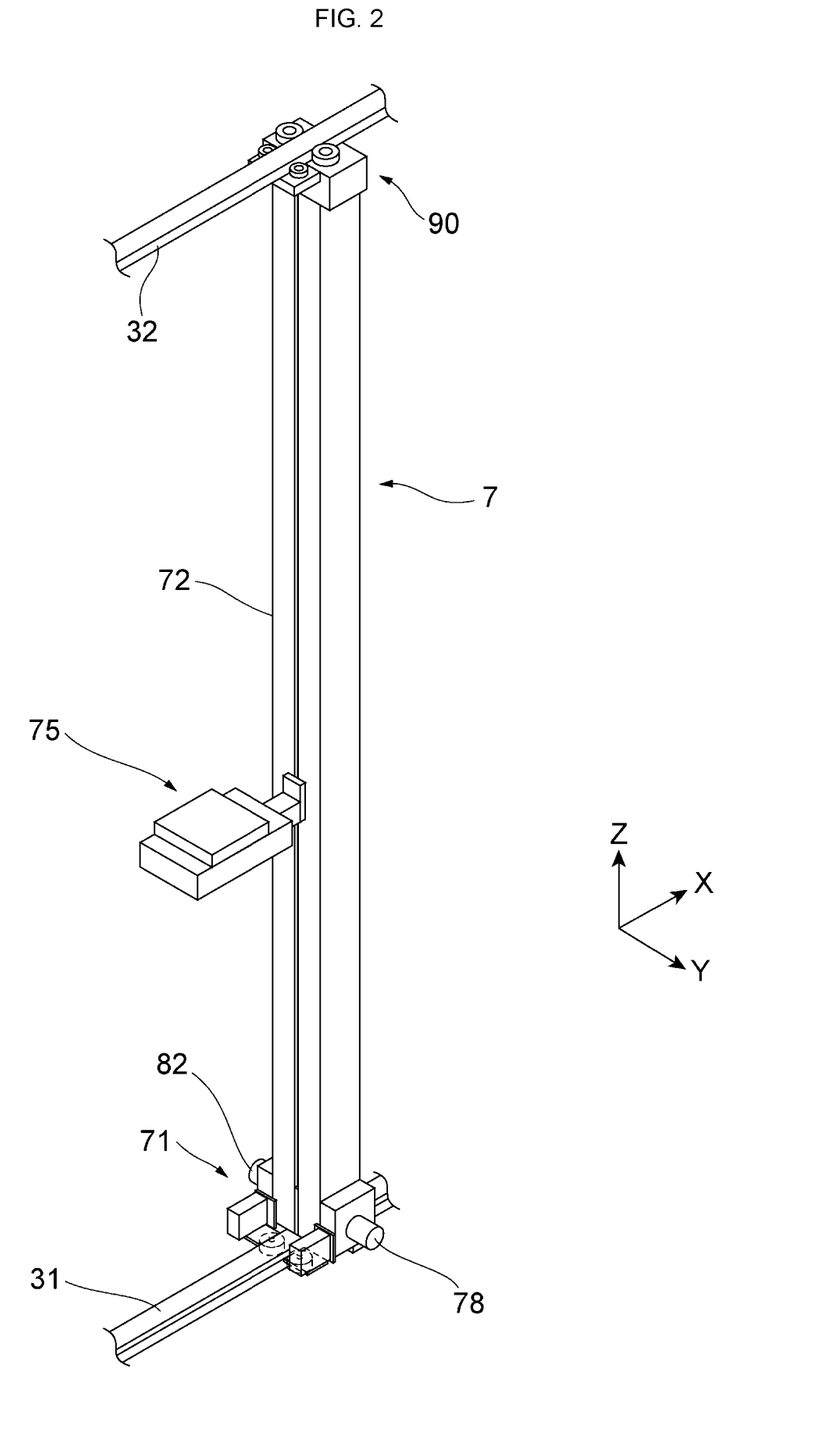
FIG. 2 is a perspective view of a stacker crane according to the example.
Figure 3:
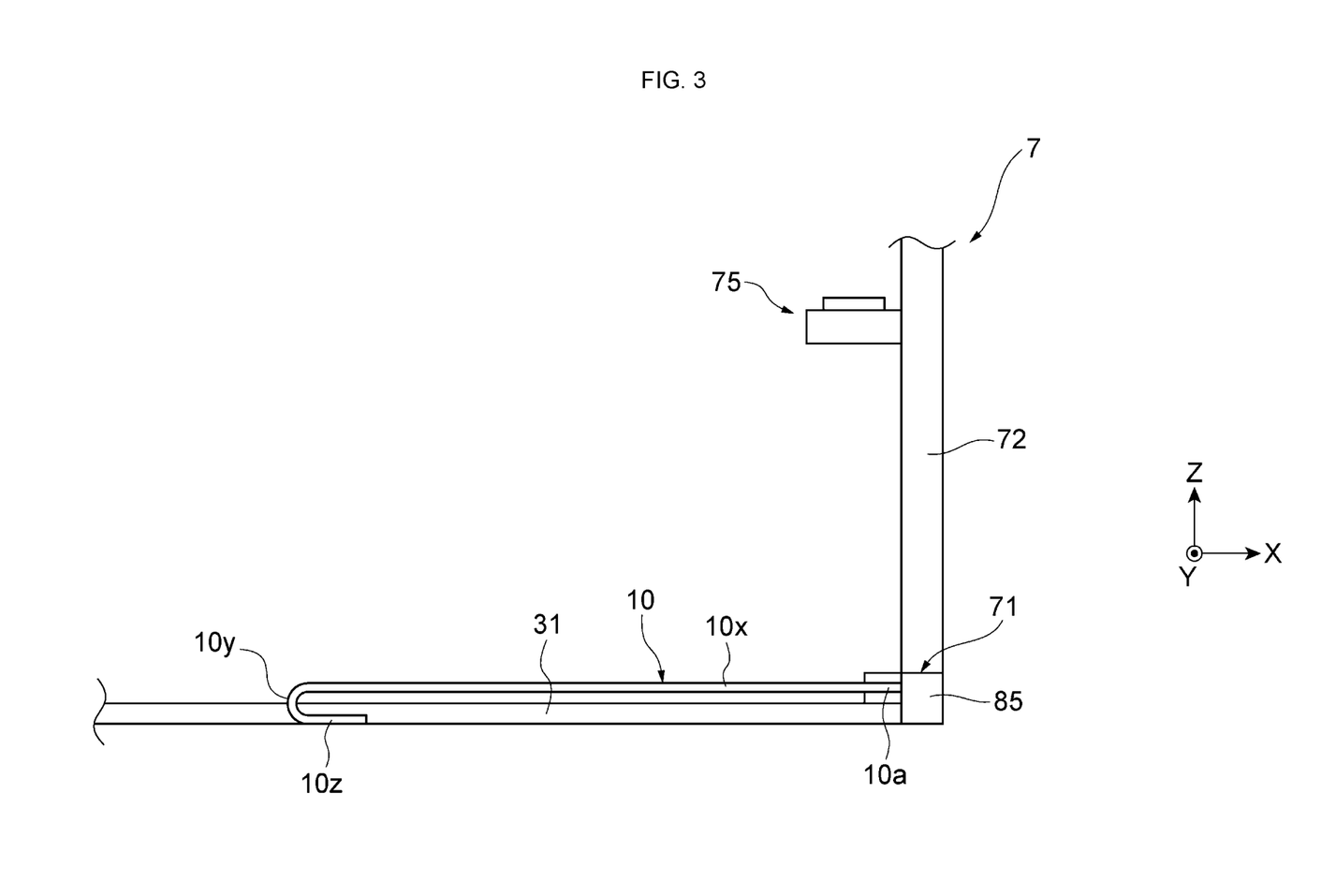
FIG. 3 is a front view of outline of a cable unit according to the example.

As shown in FIGS. 2 and 3, the stacker crane 7 includes a travel unit 71, a mast 72, a transfer unit 75, and an auxiliary travel unit 90. The travel unit 71 has a traveling motor 78, a lifting motor 82, and a housing 85. The travel unit 71 travels along the travel rail 31. The travel unit 71 includes drive wheels which rotate and move along a top surface of the travel rail 31. The traveling motor 78 is a drive source of a traveling drive wheel 76. The lifting motor 82 is a drive source of an elevator 73. The housing 85 houses the traveling motor 78 and the lifting motor 82. FIG. 2 illustrates a state in which the housing 85 is removed. The mast 72 is erected on the upper portion of the travel unit 71 in the Z direction. The transfer unit 75 transfers an article from/to the shelf S and transfers an article from/to the storage/retrieval port. The auxiliary travel unit 90 travels along the auxiliary rail 32. The auxiliary travel unit 90 includes a pair of drive wheels configured to rotate and move at both sides of the auxiliary rail 32.

Figure 4:
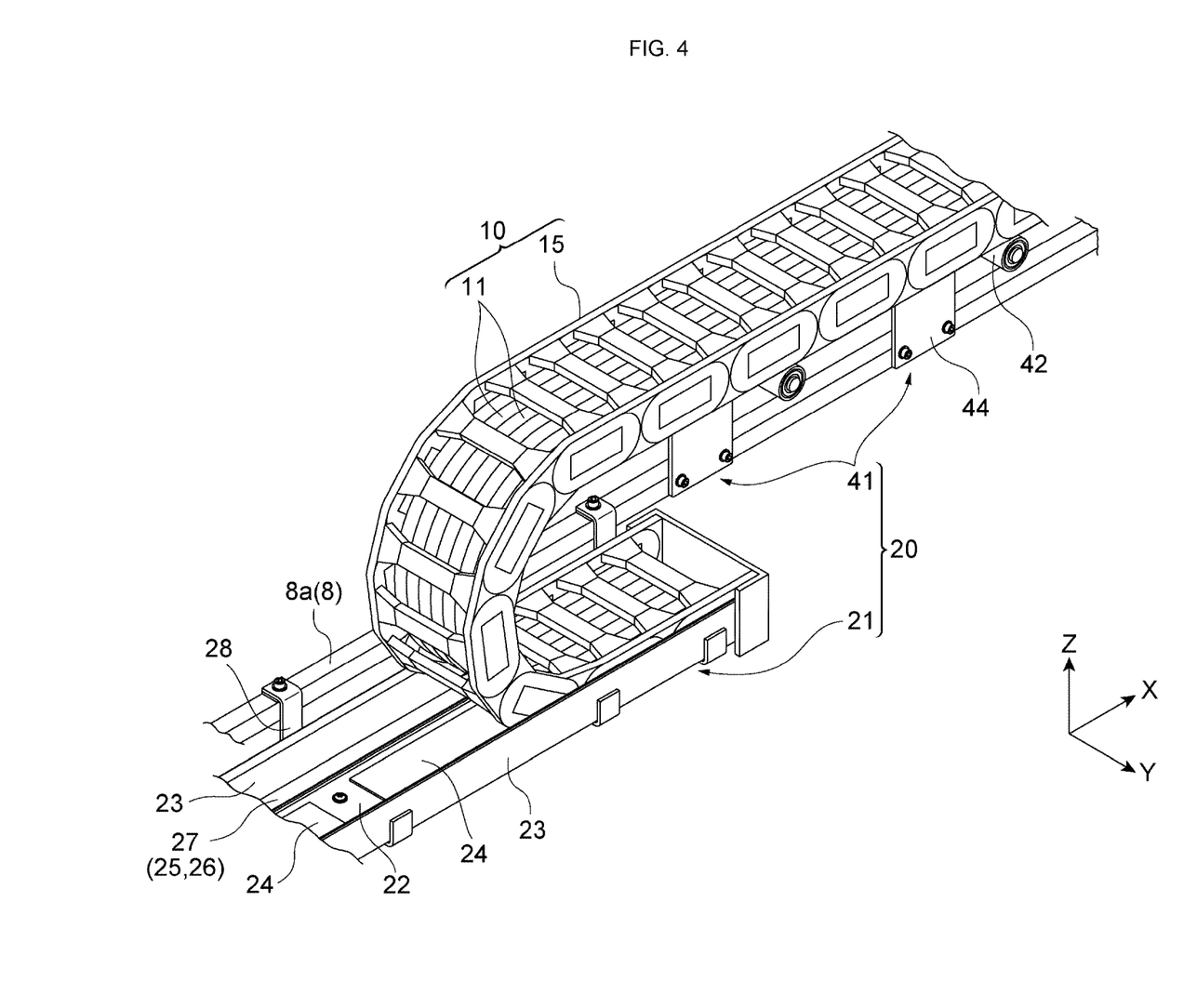
FIG. 4 is a perspective view of the cable unit, a fixed guide, and a guide roller according to the example.

As shown in FIGS. 3 and 4, the transport system 1 includes a cable unit 10. One end 10a of the cable unit 10 is connected with the stacker crane 7. The cable unit 10 moves in accordance with movement of the stacker crane 7. The cable unit 10 has a longitudinal shape. The cable unit 10 includes an upper portion 10x extending in one side of the X direction from the stacker crane 7, a U-shaped portion 10y extending to fold downward in a U shape from the upper portion 10x, and a lower portion 10z extending in the other side of the X direction from the U-shaped portion 10y. When the stacker crane 7 moves to one side or the other side of the X direction, the cable unit 10 moves such that the one end 10a and the U-shaped portion 10y stroke (move) to one side or the other side accordingly.

The cable unit 10 has a power cable 11 and a CABLEVEYOR 15. The power cable 11 is connected with the stacker crane 7 and with a power source unit (not illustrated) located in the stocker 2. Whereby, the stacker crane 7 is powered from the power source unit via the power cable 11. It is not especially limited to the power cable 11 and any cable having various shapes or specifications is usable.

The CABLEVEYOR 15 internally houses the power cable 11 to protect the power cable 11. In addition, the CABLEVEYOR 15 guides the power cable 11 so that the power cable 11 can follow movement of the stacker crane 7. The CABLEVEYOR 15 includes a cable housing unit. The CABLEVEYOR 15 has a movable end and a fixed end. The movable end of the CABLEVEYOR 15 is connected with the travel unit 71 of the stacker crane 7. The fixed end of the CABLEVEYOR 15 is attached and fixed to a table 8 (refer to FIG. 5) of the stocker 2. The CABLEVEYOR 15 is configured to bend only in a direction around an axis along the Y direction. It is not especially limited to the CABLEVEYOR 15 and any component having various shapes or specifications is usable.

Figure 5:
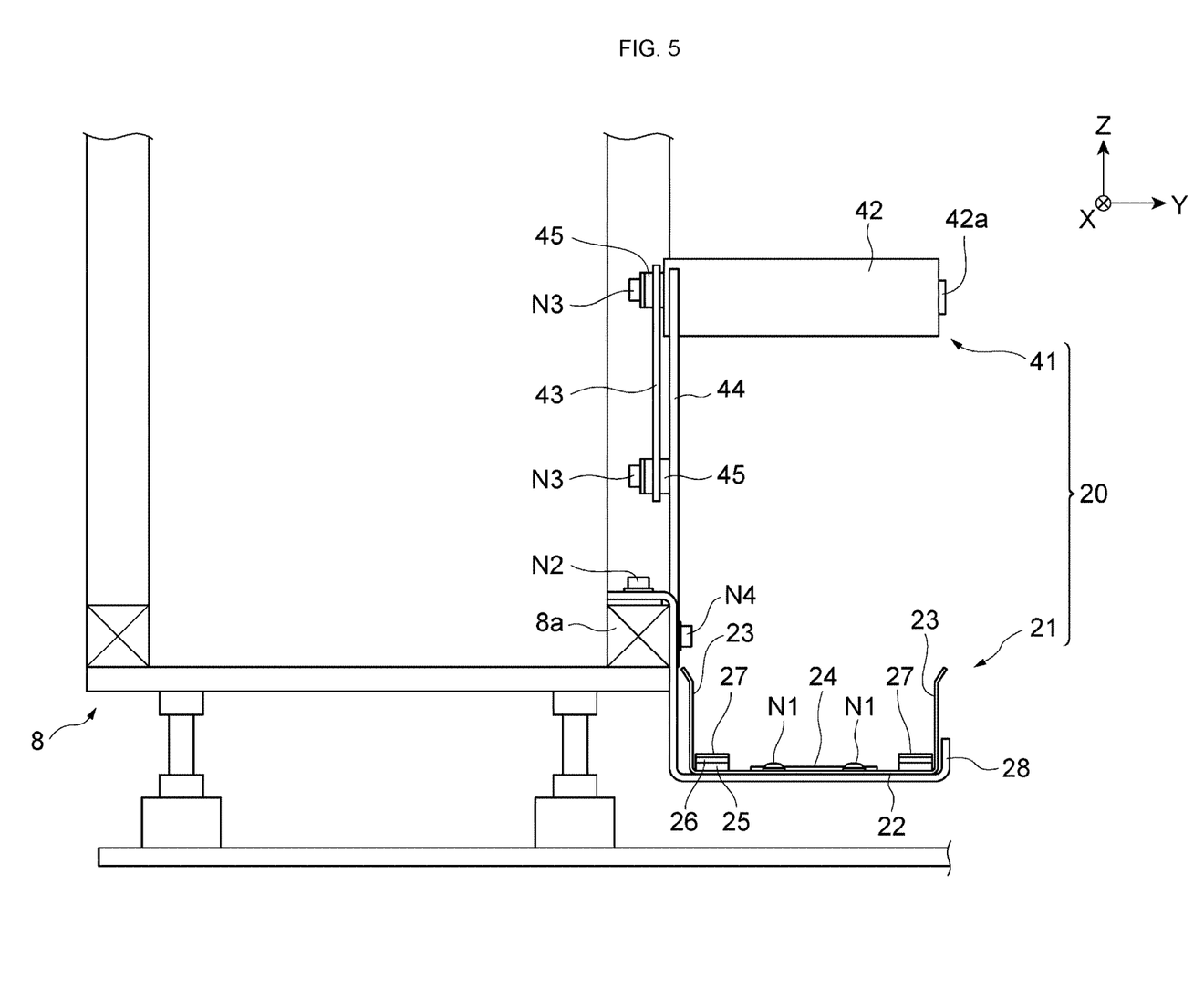
FIG. 5 is a side view of the fixed guide and the guide roller according to the example.
Figure 6:
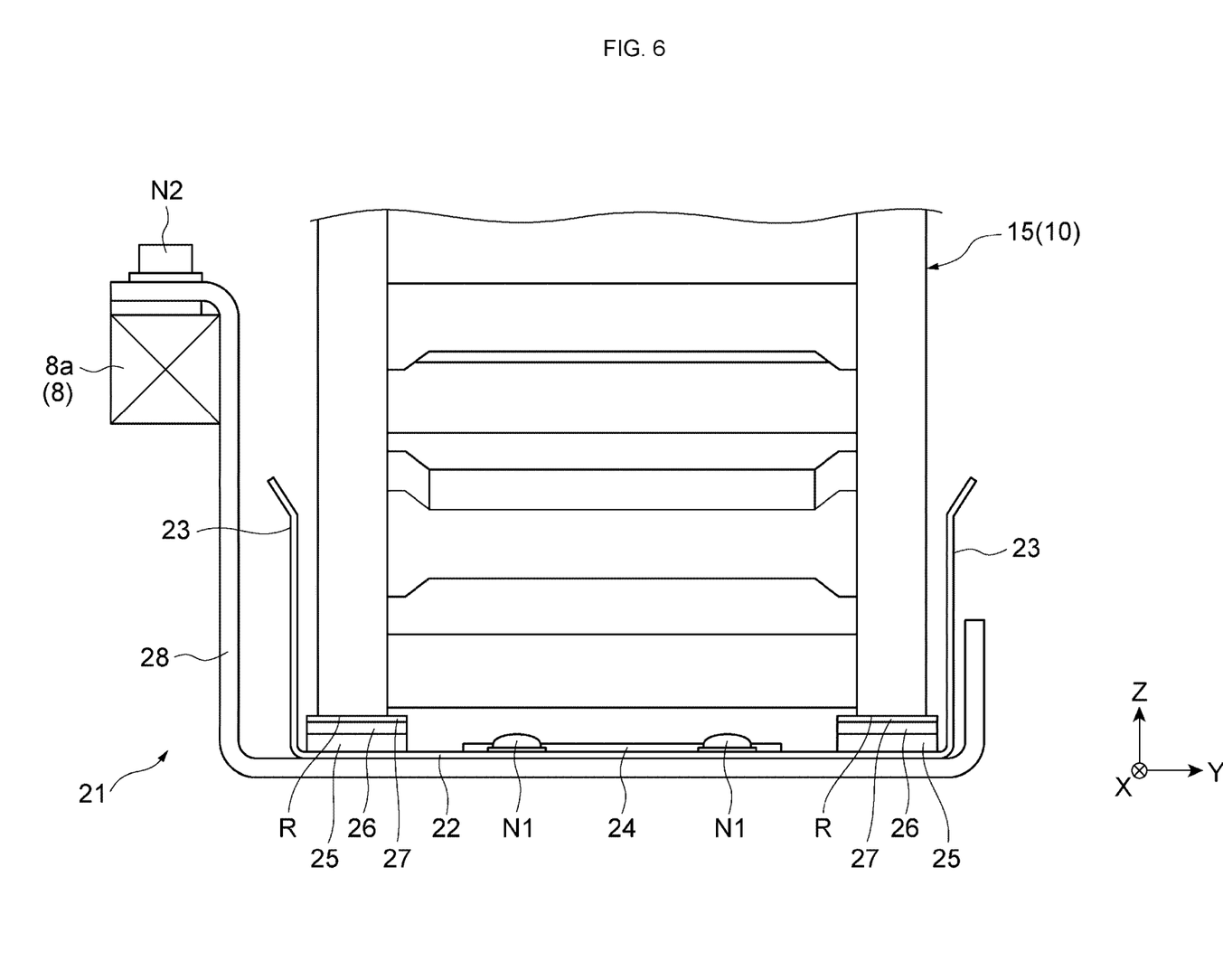
FIG. 6 is a side view of the fixed guide according to the example.
Figure 7:
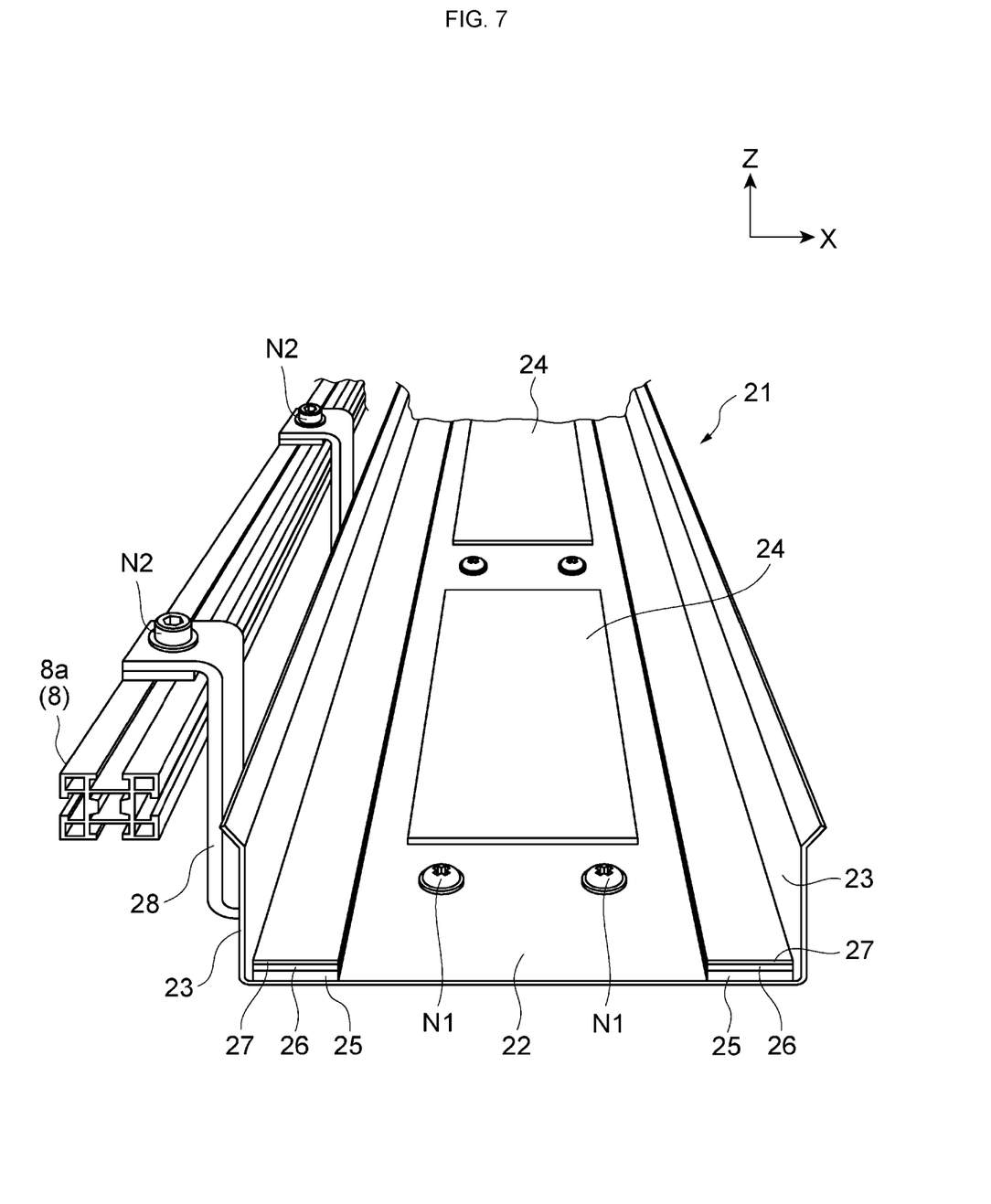
FIG. 7 is a perspective view of the fixed guide according to the example.

As shown in FIGS. 4 and 5, the transport system 1 includes a cable guide 20 to guide the cable unit 10. The cable guide 20 has a fixed guide 21 and a guide roller 41. The fixed guide 21 constitutes a placement section provided to place the cable unit 10. The fixed guide 21 comes into contact with (abut) the CABLEVEYOR 15 of the lower portion 10z in the cable unit 10. The fixed guide 21 supports the lower portion 10z and guides it to not displace the lower portion 10z. The fixed guide 21 is provided to extend to one side of the X direction from a position adjacent to the fixed end of the CABLEVEYOR 15. The cable unit 10 is not illustrated in FIG. 5 (nor in FIG. 7).

The fixed guide 21 has a base 22, a first damping member 24, a second damping member 25, a protection member 26, and a flat and smooth member 27. The base 22, the thickness direction of which is the Z direction, is a plate-shape member extending in the X direction. The width of the base 22 in the Y direction corresponds to the width of the CABLEVEYOR 15 in the Y direction. The base 22 is supported in a cantilever manner by a girder member 8a of the stand 8 supporting the stocker 2 via a fixed guide attaching stay 28.

The girder member 8a extends in the X direction below the stocker 2. The fixed guide attaching stay 28 is longitudinal in the Y direction and has a bended-plate shape. The fixed guide attaching stay 28 places the base 22 and is fixed to the base 22 with a screw N1. A tip side of the fixed guide attaching stay 28 is bent upward at right angle and is adjacent to an outer surface of a restriction wall 23 (to be described later). A base end side of the fixed guide attaching stay 28 is fixed to the top surface of the girder member 8a with a screw N2. Whereby, the fixed guide 21 is attached to the stand 8. The base 22 includes the restriction wall (restriction unit) 23.

The restriction wall 23 is a plate-shaped member protruding upward from Y-directional both ends of the base 22. The restriction wall 23 is provided to continue to the Y-directional both ends of the base 22. In other words, the restriction wall 23 is provided to bend upward at right angle from the Y-directional both ends of the base 22. The restriction wall 23 restricts the Y-directional movement of the CABLEVEYOR 15 placed on the base 22.

As shown in FIGS. 5, 6, 7 and 8, the first damping member 24 is provided on the base 22 and has damping properties higher than that of the base 22. The first damping member 24 has a rectangular sheet shape with a certain thickness in the Z direction. The first damping member 24 is adhesively fixed to the center portion of the base 22 in the Y direction. The first damping members 24 are intermittently arranged side by side along the X direction. Materials having a damping effect in general such as asphalt, butyl rubber, or lead can be used as the first damping member 24. A material for the first damping member 24 is not especially limited. Any material that can realize its function can be used for the first damping member 24. "Damping" means to decrease vibration amplitude of a vibrating object or to damp vibration. For example, the first damping member 24 repeats extension in accordance with vibration of the fixed guide 21 and converts vibration energy into heat energy to damp the vibration.

The second damping member 25 is provided on the base 22 and is made of a material different from that of the first damping member 24. The second damping member 25 is thicker than the first damping member 24 and has a rectangular sheet shape. The second damping member 25 is adhesively fixed to the Y-directional both ends on the top surface of the base 22. The second damping member 25 is continuously arranged along the X direction. Resin materials such as rubber or urethane can be used as the second damping member 25. A material for the second damping member 25 is not especially limited. Any material that can realize its function can be used for the second damping member 25.

The protection member 26 is provided on the second damping member 25 and is made of a material harder than that of the second damping member 25. The protection member 26 is thinner than the second damping member 25 and has a rectangular sheet shape. The protection member 26 is stacked on the top surface of the second damping member 25 and is adhesively fixed thereto. The protection member 26 is continuously arranged along the X direction. For example, hard rubber and nylon can be used as the protection member 26. A material for the protection member 26 is not especially limited. Any material that can realize its function can be used for the protection member 26.

The flat and smooth member 27 is provided on the protection member 26 and is made of a material having a friction coefficient lower than that of the protection member 26. The flat and smooth member 27 is thinner than the protection member 26 and has a rectangular sheet shape. The flat and smooth member 27 is stacked on the protection member 26 and is adhesively fixed thereto. The flat and smooth member 27 is continuously arranged along the X direction. For example, NEW LIGHT (registered trademark), polyethylene, fluorine, TEFLON (registered trademark), and vinyl chloride or the like can be used as the flat and smooth member 27. A material for the flat and smooth member 27 is not especially limited. Any material that can realize its function can be used for the flat and smooth member 27.

Figure 8:
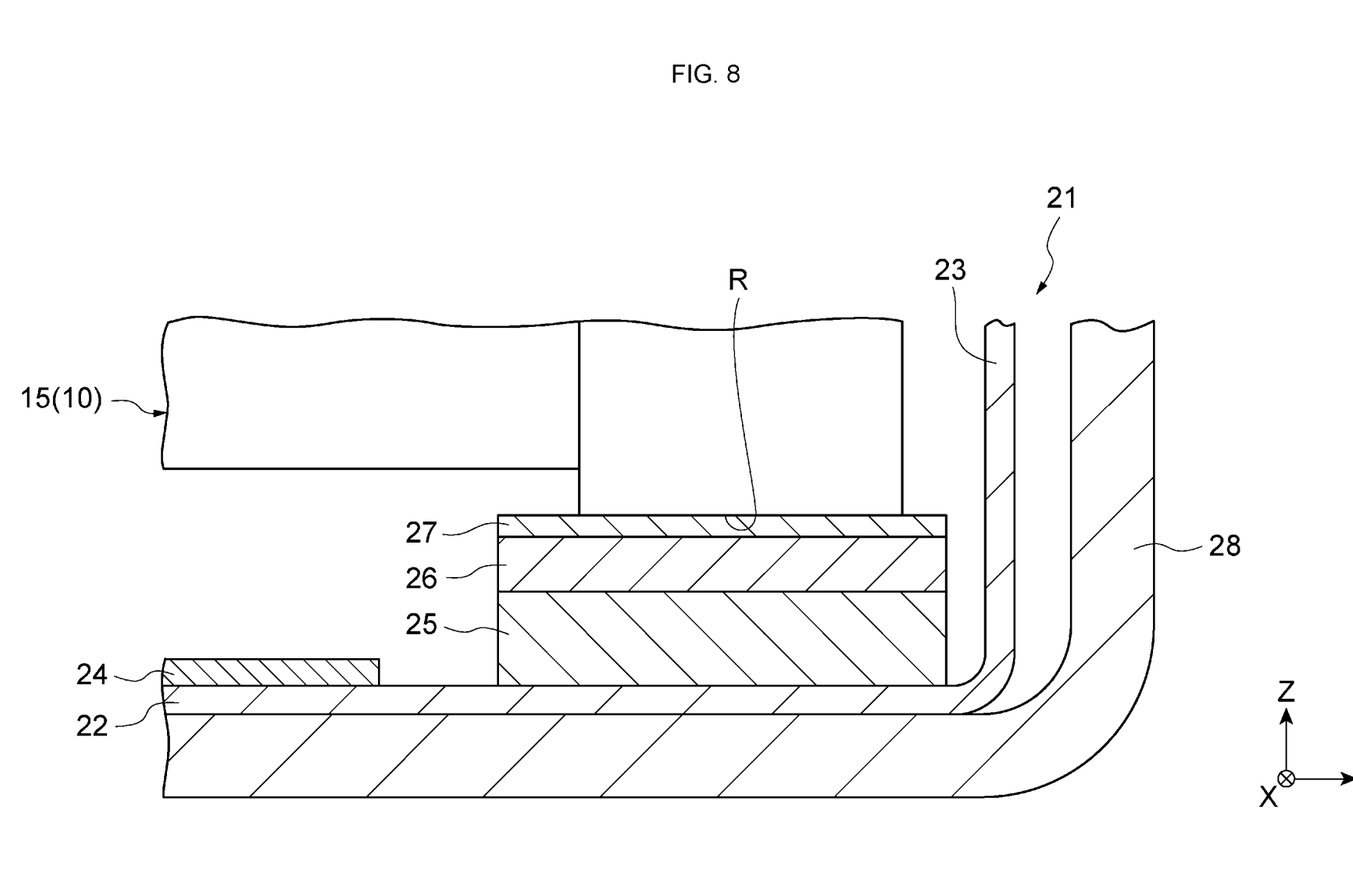
FIG. 8 is an enlarged side sectional view of a part of the fixed guide according to the example.

When the cable unit 10 is placed on the fixed guide 21, a part of the cable unit 10 comes into contact with the fixed guide 21. In particular, the bottom surfaces of both sides of the CABLEVEYOR 15 in the Y direction (width direction) come into contact with the top surfaces of the flat and smooth members 27. The both sides of the CABLEVEYOR 15 constitute contact surfaces R that come into contact with the fixed guide 21.

The first damping member 24 does not support the cable unit 10 thereon. That is, the first damping member 24 is provided at a position that does not overlap with the both sides of the CABLEVEYOR 15 viewed from above. The first damping member 24 is arranged between the both sides of the CABLEVEYOR 15 viewed from above. The top surface of the first damping member 24 is not located above the top surface of the flat and smooth member 27. A gap is formed between the first damping member 24 and the CABLEVEYOR 15.

The second damping member 25 supports the cable unit 10 thereon. The protection member 26 supports the cable unit 10 thereon. The flat and smooth member 27 supports the cable unit 10 thereon. The second damping member 25, the protection member 26, and the flat and smooth member 27 are provided at a position that overlaps the both sides of the CABLEVEYOR 15 viewed from above.

As shown in FIGS. 4, 5, 9, and 10, a guide roller 41 comes into contact with the CABLEVEYOR 15 of the upper portion 10x in the cable unit 10. The guide roller 41 supports the upper portion 10x slidably in the X direction and guides the x-directional movement of the upper portion 10x. The guide roller 41 is arranged side-by-side at a certain interval along the X direction on the other side of the X direction from the fixed guide 21.

Figure 9:
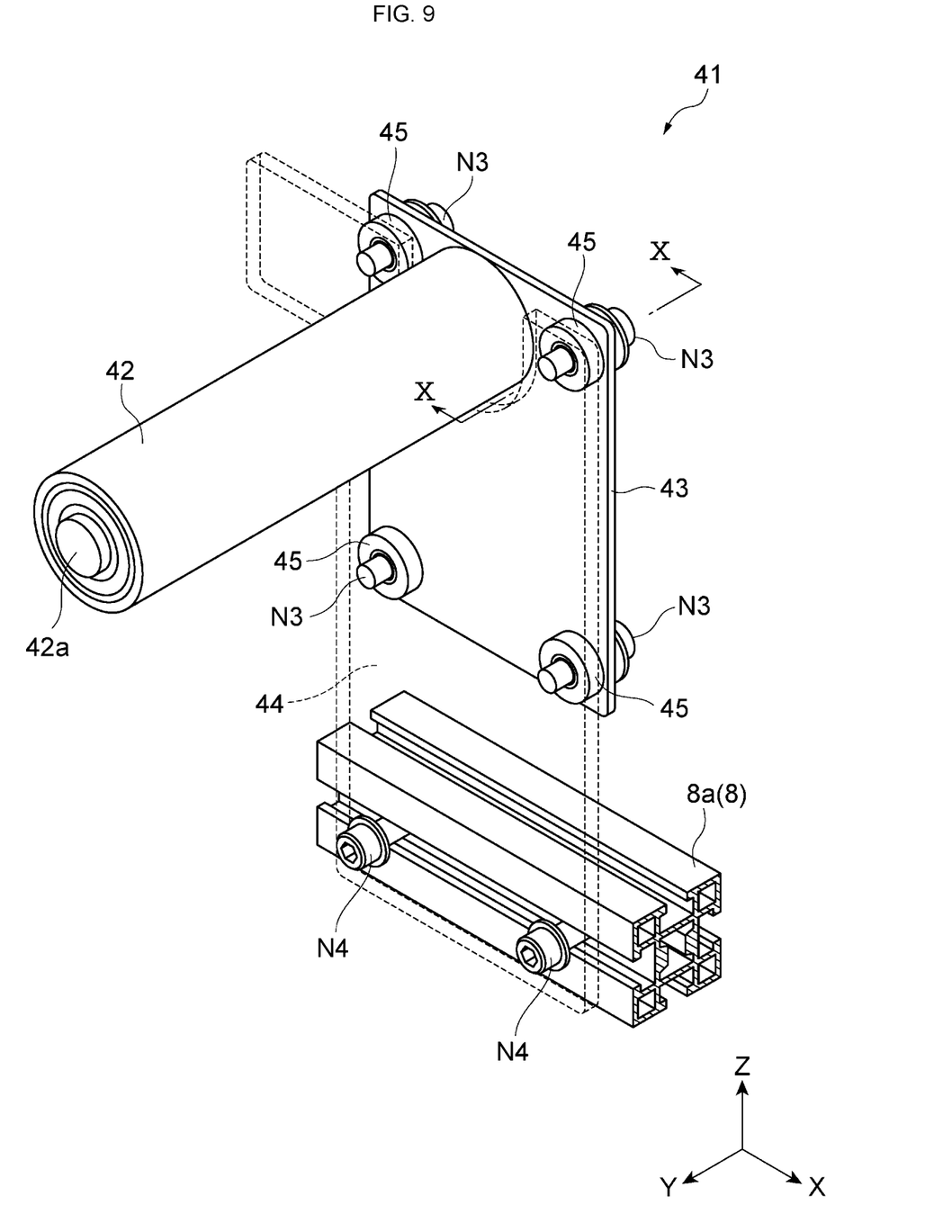
FIG. 9 is a perspective view of the guide roller according to the example.
Figure 10:
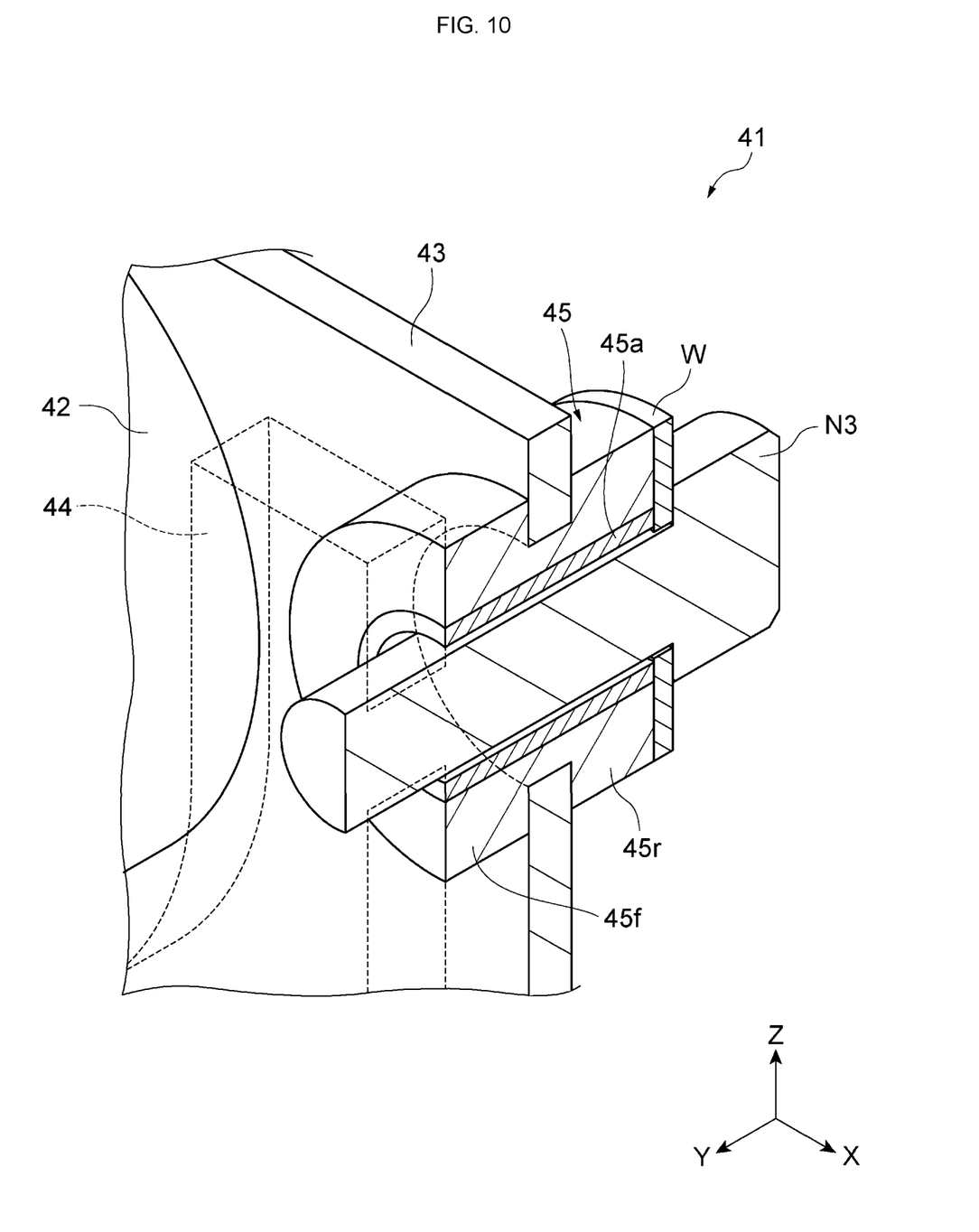
FIG. 10 is a sectional view along X-X line of FIG. 9.

The guide roller 41 includes a roller 42, a roller attaching stay 43, a stand attaching stay 44, and a grommet 45. The roller 42 is provided rotatably around a rotation axis 42a extending in the Y direction. The roller attaching stay 43, the thickness direction of which is the Y direction, has a plate shape. The base end side of the rotation axis 42a of the roller 42 is fixed to the upper portion of the roller attaching stay 43 with a screw or the like.

The stand attaching stay 44, the thickness direction of which is the Y direction, has a plate shape. A U-shaped notch 44 viewed from the Y direction is formed on the upper portion of the stand attaching stay 44. The roller 42 is inserted through the notch 44. The roller attaching stay 43 is stacked at a certain interval at the back side of area between the upper portion and the center portion of the stand attaching stay 44. In this state, the roller attaching stay 43 is fixed to the stand attaching stay 44 with screws N3 inserted into four corners thereof. The lower portion of the stand attaching stay 44 is fixed to the front surface of the girder member 8a with screws N4. Whereby, the guide roller 41 is attached to the stand 8.

The grommet 45 is provided around an axis of the screw N3 via a collar 45a. The grommet 45, the Y direction of which is the axis direction, is a cylindrical member. The grommet 45 is made of rubber. The diameters of the front end 45f and the back end 45r of the grommet 45 in the axis direction are expanded. The front end 45f is arranged between the roller attaching stay 43 and the stand attaching stay 44. The back end 45r is arranged to abut against the back surface of the roller attaching stay 43. The edge of the roller attaching stay 43 and the edge of the stand attaching stay 44 are cut by intervention of the grommet 45 so that transmission of vibration caused by the guide roller 41 to the stand 8 is suppressed. The collar 45a is a cylindrical member arranged between the grommet 45 and the screw N3. The collar 45a prevents the grommet 45 from being excessively crushed in the Y direction by a tightening of the screw N3. A washer W is provided between head of the screw N3 and the back end 45r of the grommet 45 in the Y direction.

In the guide roller 41, the bottom surface of the CABLEVEYOR 15 of the upper portion 10x of the cable unit 10 comes into contact with the roller 42. In response to X-directional movement of the CABLEVEYOR 15 along with X-directional movement of the stacker crane 7, the roller 42 rotates to guide the X-directional movement of the CABLEVEYOR 15.

In the transport system 1 configured as described above, when the stacker crane 7 moves to one side of the X direction, the U-shaped portion 10y of the cable unit 10 strokes to one side of the X direction and moves such that the lower portion 10z increases. In this process, it is concerned that as the lower portion 10z increases, the CABLEVEYOR 15 bumps against and comes into contact with the fixed guide 21, which causes vibration. However, in the transport system 1, vibration caused by movement of the cable unit 10 can be suppressed by the first damping member 24. In addition, no abrasion is caused by a contact between the first damping member 24 and the cable unit 10 with each other, and no load of the cable portion 10 is applied to the first damping member 24. Thus, the first damping member 24 is not easily degraded. Therefore, durability of vibration suppression performance of the transport system 1 can be improved.

In the transport system 1, a part of the CABLEVEYOR 15 of the cable unit 10 placed on the fixed guide 21 is in contact with the fixed guide 21, and the first damping member 24 is provided at a position that does not overlap with the relative contact surface R of the cable unit 10 viewed from above. In this example, a configuration can be specifically realized in which the first damping member 24 does not support the cable unit 10.

In the transport system 1, the cable unit 10 placed on the fixed guide 21 is in contact with the fixed guide 21 at both sides of the CABLEVEYOR 15, and the first damping member 24 is arranged between the both sides of the cable unit 10 viewed from above. In this example, a configuration can be specifically realized in which the first damping member 24 does not overlap with the contact surface R of the cable unit 10 viewed from above. Further, a space between the both sides can be utilized, thus enabling a space saving.

In the transport system 1, the cable unit 10 has a power cable 11 and a CABLEVEYOR 15 that are connected to the stacker crane 7. The CABLEVEYOR 15 houses the power cable 11 therein and guides the power cable 11 so that the power cable 11 can follow movement of the stacker crane 7. In this example, the cable unit 10 can be specifically configured. In addition, the power cable 11 can follow movement of the stacker crane 7 while being protected.

The stacker crane 7 is configured to move in the X direction. The base 22 has a restriction wall 23 to restrict the Y-directional movement of the cable unit 10 placed thereon. In this example, the restriction wall 23 can prevent the cable unit 10 from shifting in the Y direction.

The fixed guide 21 has the second damping member 25 provided at the base 22 and made of a material different from that of the first damping member 24. The second damping member 25 supports the cable unit 10 thereon. Whereby, vibration caused by movement of the cable unit 10 can be further suppressed.

The second damping member 25 is provided at a position that overlaps with the contact surface R where the cable unit 10 comes into contact with the fixed guide 21 viewed from above. In this example, a configuration can be specifically realized in which the second damping member 25 supports the cable unit 10.

The fixed guide 21 has the protection member 26 provided on the second damping member 25 and made of a material harder than that of the second damping member 25. Whereby, the second damping member 25 can be protected.

The fixed guide 21 has the flat and smooth member 27 provided on the protection member 26 and made of a material having a friction coefficient lower than that of the protection member 26. Whereby, abrasion of the protection member 26 caused by a contact with the cable unit 10 can be suppressed.

The transport system 1 includes a stocker 2 having a plurality of shelves S to house an article and the stand 8 to support the stocker. The fixed guide 21 is attached to the stand 8. In this example, vibration caused by movement of the cable unit 10 is easily transmitted to the stocker 2 and the article via the stand 8. Suppression of vibration caused to the article is important. Thus, the above described effects to suppress vibration caused by movement of the cable unit 10 are especially effective.

Figure 11:
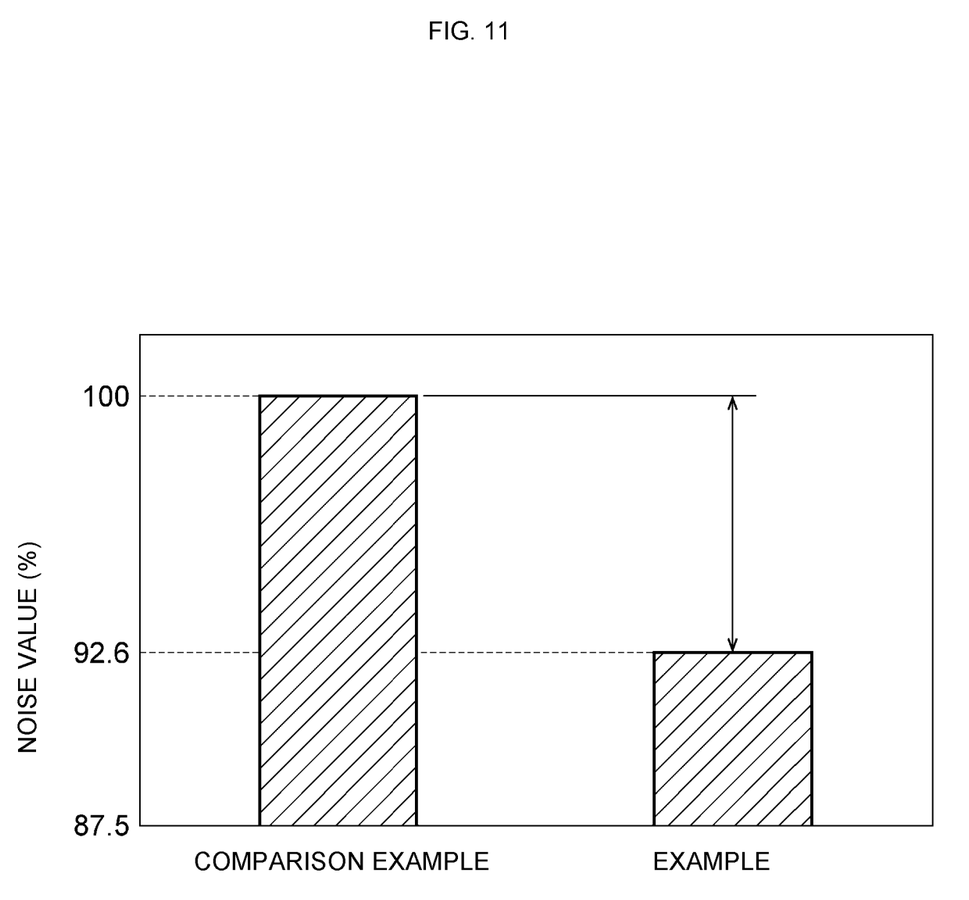
FIG. 11 is a view illustrating a noise test result of the example and a comparison example.

FIG. 11 is a view illustrating a noise test result of an example and a comparison example. The example corresponds to the above described transport system 1. In the example, asphalt is used as a material for the first damping member 24, and a styrene-based thermoplastic elastomer (TPS) is used as a material for the second damping member 25, acrylic rubber (ACM) is used as a material for the protection member 26, and NEW LIGHT is used as a material for the flat and smooth member 27. The comparison example is the same as the example except the first damping member 24, the protection member 26, and the flat and smooth member 27 are not provided and urethane is used as the second damping member 25. Noise value is a relative value when a noise value (db) of the comparison example is used as a standard. As a result of the noise test, we confirmed that the noise value of the example is decreased by approximately 7 percent with respect to the noise value of the comparison example.

The examples are described as above described, but our systems are not limited to the above examples.

In the above described examples, a position of the first damping member 24 is not especially limited as long as the position is a position at which the first damping member 24 does not support the cable unit 10. For example, the first damping member 24 may be provided on the bottom surface of the base 22 or may be provided on the restriction wall 23 of the base 22. In the above described examples, the number of the first damping member 24 to be provided is not especially limited. One first damping member 24 or a plurality of first damping member 24 may be provided. In the above described examples, the first damping member 24 may be continuously arranged along the X direction. In the above described examples, instead of or in addition to the power cable 11, a signal cable being connected with the stacker crane 7 may be provided. In this example, the CABLEVEYOR 15 houses the signal cable therein, and guides the signal cable so that the signal cable can follow movement of the stacker crane 7.

Each configuration in the above described examples and variations is not limited to the above described materials and shapes. Various materials and shapes can be applied. Each configuration in the above described examples or variations can be optionally applied to each configuration in other examples or variations. A part of each configuration in the above described examples or variations can be appropriately omitted without departing from the scope of this disclosure.

The invention claimed is:

1. A transport system comprising:
a transport device that transports an article;
a cable unit, one end of which is connected to the transport device, the other end of which is fixed to ground side, the cable unit configured to move in accordance with movement of the transport device; and
a placement section where the cable unit can be placed,
wherein the placement section has a base, and a first damping member provided on the base and having damping properties higher than that of the base,
the placement section is fixed to the ground side without moving in accordance with the movement of the cable unit; and
the first damping member does not support the cable unit thereon.

2. The transport system according to claim 1,
wherein a part of the cable unit placed on the placement section is in contact with the placement section, and
the first damping member is provided at a position that does not overlap with a contact surface where the cable unit comes into contact with the placement section viewed from above.

3. The transport system according to claim 2,
wherein the cable unit placed on the placement section is in contact with the placement section at both sides of its width direction, and
the first damping member is arranged between the both sides of the cable unit viewed from above.

4. The transport system according to claim 1, wherein the cable unit includes:
at least any one of a power cable and a signal cable connected to the transport device; and
a cable housing unit connected to the transport device and configured to house at least any one of the power cable and the signal cable inside and to guide at least any one of the power cable and the signal cable so that at least any one of the power cable and the signal cable follows movement of the transport device.

5. The transport system according to claim 1,
wherein the placement section has a second damping member provided on the base and made of a material different from that of the first damping member, and
the second damping member supports the cable unit thereon.

6. The transport system according to claim 5, wherein the second damping material is provided at a position that overlaps with a contact surface where the cable unit comes into contact with the placement section viewed from above.

7. The transport system according to claim 5, wherein the placement section has a protection member provided on the second damping member and made of a material harder than that of the second damping member.

8. The transport system according to claim 1, comprising:
a stocker having a plurality of shelves to house the article; and
a stand to support the stocker,
wherein the placement section is attached to the stand.

9. A transport system comprising:
a transport device that transports an article;
a cable unit, one end of which is connected to the transport device, the other end of which is fixed to ground side, the cable unit configured to move in accordance with movement of the transport device; and
a placement section where the cable unit can be placed,
wherein the placement section has a base, and a first damping member provided on the base and having damping properties higher than that of the base; and
the first damping member does not support the cable unit thereon;
wherein the transport device is configured to move in a first direction, and
the base has a restriction unit configured to restrict movement of the cable unit placed on the base in a second direction intersecting the first direction.

10. A transport system comprising:
a transport device that transports an article;
a cable unit, one end of which is connected to the transport device, the other end of which is fixed to ground side, the cable unit configured to move in accordance with movement of the transport device; and
a placement section where the cable unit can be placed,
wherein the placement section has a base, and a first damping member provided on the base and having damping properties higher than that of the base; and
the first damping member does not support the cable unit thereon;
wherein the placement section has a second damping member provided on the base and made of a material different from that of the first damping member, and
the second damping member supports the cable unit thereon wherein the placement section has a protection member provided on the second damping member and made of a material harder than that of the second damping member wherein the placement section has a flat and smooth member provided on the protection member and made of a material having a friction coefficient lower than that of the protection member.

* * * * *